US008822895B2

(12) United States Patent
Abedin et al.

(10) Patent No.: US 8,822,895 B2
(45) Date of Patent: Sep. 2, 2014

(54) FIBER FUSE DETECTING APPARATUS

(75) Inventors: Kazi Sarwar Abedin, Koganei (JP); Toshio Morioka, Koganei (JP)

(73) Assignee: National Institute of Information and Communications Technology, Koganei-shi (JP)

( * ) Notice: Subject to any disclaimer, the term of this patent is extended or adjusted under 35 U.S.C. 154(b) by 680 days.

(21) Appl. No.: 13/123,445

(22) PCT Filed: Sep. 18, 2009

(86) PCT No.: PCT/JP2009/066852
§ 371 (c)(1),
(2), (4) Date: Apr. 8, 2011

(87) PCT Pub. No.: WO2010/041564
PCT Pub. Date: Apr. 15, 2010

(65) Prior Publication Data
US 2011/0220776 A1    Sep. 15, 2011

(30) Foreign Application Priority Data
Oct. 9, 2008    (JP) ................................. 2008-262635

(51) Int. Cl.
*G01J 1/32*    (2006.01)
*G01N 21/88*    (2006.01)
*H04B 10/03*    (2013.01)
*G02B 6/26*    (2006.01)
*G01M 11/00*    (2006.01)
*H04B 10/079*    (2013.01)

(52) U.S. Cl.
CPC ......... *G01M 11/3145* (2013.01); *H04B 10/079* (2013.01); *G02B 6/26* (2013.01); *G01M 11/35* (2013.01); *H04B 10/07957* (2013.01); *G01M 11/3154* (2013.01)
USPC ...................... 250/205; 250/227.14; 356/73.1; 398/20; 340/600; 359/341.44

(58) Field of Classification Search
CPC ....................... G01M 11/3145; G01M 11/3154; G01M 11/31; G01M 11/3109; G01M 11/35; G01M 11/37; G02B 6/26; G02B 6/262; G02B 6/264; H04B 10/03; H04B 10/07; H04B 10/071; H04B 10/079; H04B 10/0791; H04B 10/07957
USPC ................. 250/205, 227.14, 227.18, 227.21; 365/73.1; 340/600; 359/334, 341.1, 359/341.44, 341.4; 398/9, 15, 17, 20, 21, 398/23; 356/73.1
See application file for complete search history.

(56) References Cited

U.S. PATENT DOCUMENTS 5,396,569 A * 3/1995 Yanagawa et al. ............... 385/24
5,703,682 A * 12/1997 Eslambolchi ................ 356/73.1
(Continued)

FOREIGN PATENT DOCUMENTS

| JP | 58 149703 | 10/1983 |
| JP | 2003 227776 | 8/2003 |
| JP | 2004 279557 | 10/2004 |

OTHER PUBLICATIONS

International Search Report issued Oct. 27, 2009 in PCT/JP09/66852 filed Sep. 18, 2009.

(Continued)

*Primary Examiner* — John Lee
(74) *Attorney, Agent, or Firm* — Oblon, Spivak, McClelland, Maier & Neustadt, L.L.P.

(57) ABSTRACT

A fiber fuse detecting apparatus provides early detection of a fiber fuse generation in an optical fiber that propagates laser light, preventing the damage from expanding. It comprises light input means arranged on a laser light incidence side of the optical fiber that inputs at least a portion of reverse direction propagation light propagating in a reverse direction to light incidenting the optical fiber, light receiving means that photo-electrically converts light input by the light input means, electric filter means that extracts from an output signal of the light receiving means a prescribed frequency band component that contains a periodic signal due to fiber fuse, detecting means that detects change of or a prescribed value in output level of the electric filter means, and warning means that emits a warning signal in response to a detection output of the detecting means. The laser light to the optical fiber is stopped or reduced by means of the warning means.

16 Claims, 13 Drawing Sheets

(56) References Cited

U.S. PATENT DOCUMENTS

| | | | |
|---|---|---|---|
| 6,295,147 B1* | 9/2001 | Yamane et al. | 398/9 |
| 6,628,871 B2* | 9/2003 | Maroney et al. | 385/123 |
| 6,640,043 B2 | 10/2003 | Handerek | |
| 6,681,079 B1* | 1/2004 | Maroney | 398/15 |
| 6,700,655 B2* | 3/2004 | Uchiyama et al. | 356/73.1 |
| 6,728,495 B1* | 4/2004 | Miki et al. | 398/197 |
| 7,031,049 B2* | 4/2006 | Kamada et al. | 359/334 |
| 7,153,034 B2* | 12/2006 | Sasaoka et al. | 385/71 |
| 7,426,350 B1* | 9/2008 | Sun et al. | 398/193 |
| 7,440,177 B2* | 10/2008 | Ghera et al. | 359/341.44 |
| 7,505,197 B2* | 3/2009 | Sugaya et al. | 359/334 |
| 7,583,371 B2* | 9/2009 | MacDougall | 356/73.1 |
| 7,839,902 B2* | 11/2010 | Li et al. | 372/6 |
| 7,872,736 B2* | 1/2011 | Rogers et al. | 356/73.1 |
| 7,873,273 B2* | 1/2011 | Koyamada | 398/28 |
| 8,264,676 B2* | 9/2012 | Kanellopoulos et al. | 356/73.1 |
| 2001/0050768 A1* | 12/2001 | Uchiyama et al. | 356/73.1 |
| 2004/0196158 A1* | 10/2004 | Sugaya et al. | 340/815.4 |
| 2004/0218882 A1* | 11/2004 | Bickham et al. | 385/127 |
| 2006/0013585 A1* | 1/2006 | Hnatiw et al. | 398/38 |
| 2006/0018586 A1* | 1/2006 | Kishida | 385/12 |
| 2011/0220776 A1* | 9/2011 | Abedin et al. | 250/205 |

OTHER PUBLICATIONS

Kashyap, R. et al., "Observation of Catastrophic Self-Propelled Self-Focusing in Optical Fibers", Electronics Letters, vol. 24, No. 1, pp. 47-49, (Jan. 7, 1988).

Shuto, Yoshito et al., "Fiber Fuse Generation in Single-Mode Fiber-Optic Connectors", IEEE Photonics Technology Letters, vol. 16, No. 1, pp. 174-177, (Jan. 2004).

Percival, R.M. et al., "Catastrophic damage and accelerated ageing in bent fibres caused by high optical powers", Electronics Letters, vol. 36, No. 5, pp. 414-416, (Mar. 2, 2000).

Hand, D.P. et al., "Single-Mode Tapers as Fibre Fuse Damage Circuit-Breakers", Electronics Letters, vol. 25, No. 1, pp. 33-34, (Jan. 5, 1989).

* cited by examiner

FIBER FUSE DETECTING APPARATUS

TECHNICAL FIELD

This invention relates to a fiber fuse detecting apparatus that detects fiber fuse in optical fiber, and prevents the expansion of damage caused thereby.

BACKGROUND TECHNOLOGY

Even in communications applications, optical power propagated by optical fiber is tending to increase, due to the extension of non-repeater distance and the increase in multiplex numbers due to wavelength division multiplexing (WDM) technology, and it is considered possible that the average power may reach several watts sometimes or later. Attempts are also being made to transmit power by optical fiber.

When high power light is propagated in an optical fiber, it is known that there occurs an optical fiber destruction phenomenon called a fiber fuse, which is due to fine dirt or the like on the light transmission path or the optical connector. Specifically the dirty portion for example ignites, fusing the core of the optical fiber, and the fusing phenomenon progresses towards the light source, with the result that the optical fiber is destroyed as the periodic formation of micron-sized voids takes place in the core of the optical fiber, as shown in FIG. 6. The propagation velocity of this fiber fuse phenomenon is from around 100 cm to several meters a second, depending on the type of optical fiber and the light intensity.

Destruction caused by a fiber fuse progresses as long as the optical power density in the core does not go to or below a certain value. Since the optical power is higher closer to the light source, if left, the fiber fuse phenomenon will ultimately reach the light source, damaging the light source.

As means for preventing the progress of the fiber fuse phenomenon, there has been proposed the midway insertion of an optical fiber having an enlarged core diameter (see Patent Reference 1 (U.S. Pat. No. 6,640,043)). The sudden change in the mode field diameter is controlled by providing each end of the core portion having the enlarged diameter with a tapered portion that mitigates the change in core diameter.

REFERENCES

Patent Reference 1: U.S. Pat. No. 6,640,043
Non-Patent Reference 1: "Observation of catastrophic self-propelled self-focusing in optical fibers," R. Kashyap and K. J. Blow, Electron. Lett., Vol. 24, No. 1, pp. 47-49, 1988.
Non-Patent Reference 2: "Fiber Fuse Generation in Single-Mode Fiber-Optic Connectors," Yoshito Shuto, Shuichi Yanagi, Shuichiro Asakawa, Masaru Kobayashi, Member, and Ryo Nagase, IEEE Photonics Technology Letters, Vol. 16, No. 1, Page 174-177, 2004.
Non-Patent Reference 3: "Catastrophic damage and accelerated aging in bent fibres caused by high optical power," R. M. Percival, E. S. R. Sikora, and R. Wyatt, Electron. Lett., vol. 36, No. 5, 414-416 (2000).
Non-Patent Reference 4: "Single mode tapers as fiber fuse damage circuit breakers," D. P. Hand and T. A. Birks, Electron. Lett., Vol. 25, No. 1, 33-34 (1989).

DISCLOSURE OF THE INVENTION

With the method described in Patent Reference 1, the progress of a fiber fuse in a portion of an optical fiber beyond the optical fiber used for fiber fuse termination cannot be stopped. Also, a large difference in core diameters in an optical fiber used for fiber fuse termination generates mode conversion, which in communications applications has an adverse effect on signal transmission characteristics.

An object of the present invention is to provide a fiber fuse detecting apparatus that quickly detects a fiber fuse and, when required, suppresses the progress of the fiber fuse.

Therefore, to detect a fiber fuse in an optical fiber that propagates laser light, the fiber fuse detecting apparatus of the present invention uses light input means arranged on a laser light incidence side of the optical fiber that inputs at least a portion of reverse direction propagation light propagating in a reverse direction to that of light incidenting the optical fiber, light receiving means that photo-electrically converts light input by the light input means, electric filter means that extracts from an output signal of the light receiving means a prescribed frequency band component that contains a periodic signal due to fiber fuse, detecting means that detects change of or above a prescribed value in output level of the electric filter means, and warning means that emits a warning signal in response to a detection output of the detecting means.

Further, the above light input means provided with a light transmission means that transmits a light transmission signal to the above optical fiber, and inputs at least a portion of reverse direction propagation light (that is, return light) that is light from the above light transmission means reflected by the fiber fuse.

An optical coupler, for example, can be used for the above light input means. As well as a 3-decibel coupler, an optical coupler having a desired wide-range branching ratio can be used for the optical coupler.

Further, the above optical coupler is a wavelength division multiplexing system coupler. A wavelength arrayed waveguide grating filter or prism type wavelength division multiplexing system coupler or the like may be used as the wavelength division multiplexing system coupler.

Further, the above light transmission means includes a monitor laser light source for the above fiber fuse, and inputs light from the monitor laser light source to the above optical fiber via the above optical coupler. When a fuse is generated, voids are formed periodically as shown in FIG. 6, so reflectivity from the fuse end surface also changes periodically. Because of that, when monitor light is provided, return light components of the monitor light show frequency characteristics similar to those that characterize the fuse. Using a wavelength division multiplexing system coupler that is ideal for the transmission light wavelength and monitor light wavelength makes it possible to achieve coupling of the transmission light and monitor light in a lossless state.

At least a portion of the reverse direction propagation light input by the above light input means is branched to the above detecting means by an optical coupler or circulator. Light from the above monitor laser light source is input to the above optical fiber via the above optical coupler or circulator, and the above light input means.

Also, electric signals can be processed to a higher sensitivity as follows. That is, when the above electric filter means is a first electric filter means, further use is made of a second electric filter means that extracts a frequency band having an intensity that is not increased by fiber fuse generation. The above detecting means compares the first electric filter means and second electric filter means to detect change of or above a prescribed value. This makes it possible to cancel out common-mode noise transmitted by the first electric filter means and second electric filter means.

To suppress propagation loss in propagation in the optical fiber, the above monitor laser light provides an optical modulation to prevent Brillouin scattering in the above optical fiber.

The above light input means is an optical separation means that separates light propagating in a reverse direction from light propagating towards the above optical fiber. As the optical separation means, there can be used, for example, a circulator, a half-mirror, or a branching prism or the like.

The above optical separation means is arranged between the above laser light source that outputs the laser light and the above optical fiber. It is an optical element that transfers light output by the above laser light source to the above optical fiber, and transfers reverse direction propagation light from the above optical fiber to the above light receiving means.

The above detecting means is comparison means that compares an output level of the above electric filter means with a prescribed threshold value. The comparison means may be an analogue signal comparator, or a logic circuit that digitizes the signal and carries out numerical value judgment.

The above optical separation means is arranged between the above laser light source that outputs the laser light and the above optical fiber. It is an optical element that transfers light output by the above laser light source to the above optical fiber, and transfers reverse direction propagation light from the above optical fiber to the above light receiving means.

A wavelength division multiplexing system coupler that is ideal for the transmission light wavelength and the monitor light wavelength, as described above, can be used by multiplexing laser light incidenting the above optical fiber and monitor light having a different wavelength from that of the laser light. This makes it possible to achieve coupling of the transmission light and monitor light in a lossless state. This is done using an optical multiplexer that supplies the multiplexed light to the above optical fiber, and an optical filter that pass though the monitor light contained in the above reverse direction propagation light separated by the separation means, and blocks the above laser light. The above light receiving means photo-electrically converts output light from the above optical filter.

The above detecting means is a comparison means that compares an output level of the above electric filter means with a prescribed threshold value. As described above, this comparison means may be an analogue signal comparator, or a logic circuit that digitizes the signal and carries out a numerical value judgment.

The above warning means is one that, in response to a detection output by the above detecting means, emits a signal that stops the above laser light incidenting the above optical fiber. An analogue signal or a digital signal can be used for this signal.

The above warning means has an optical amplifier that amplifies a laser light before it incidents an optical fiber, and is one that, in response to a detection output by the above detecting means, emits a signal that reduces the incident power of the above laser light on the above optical fiber. An analogue signal or a digital signal can be used for this signal.

The above warning means is one that, in response to a detection output by the above detecting means, emits a signal to stop, or to reduce an amplification factor of, the optical amplifier that optically amplifies the above laser light before it incidents the above optical fiber. An analogue signal or a digital signal can be used for this signal.

The above warning means is one that, in response to a detection output by the above detecting means, controls the light source that generates the above laser light to reduce the laser output power thereof. An analogue signal or a digital signal can be used for this signal.

BEST MODE FOR CARRYING OUT THE INVENTION

In the following, aspect embodiments of the invention will be described in detail with reference to the drawings.

Embodiment 1

Figure 1:
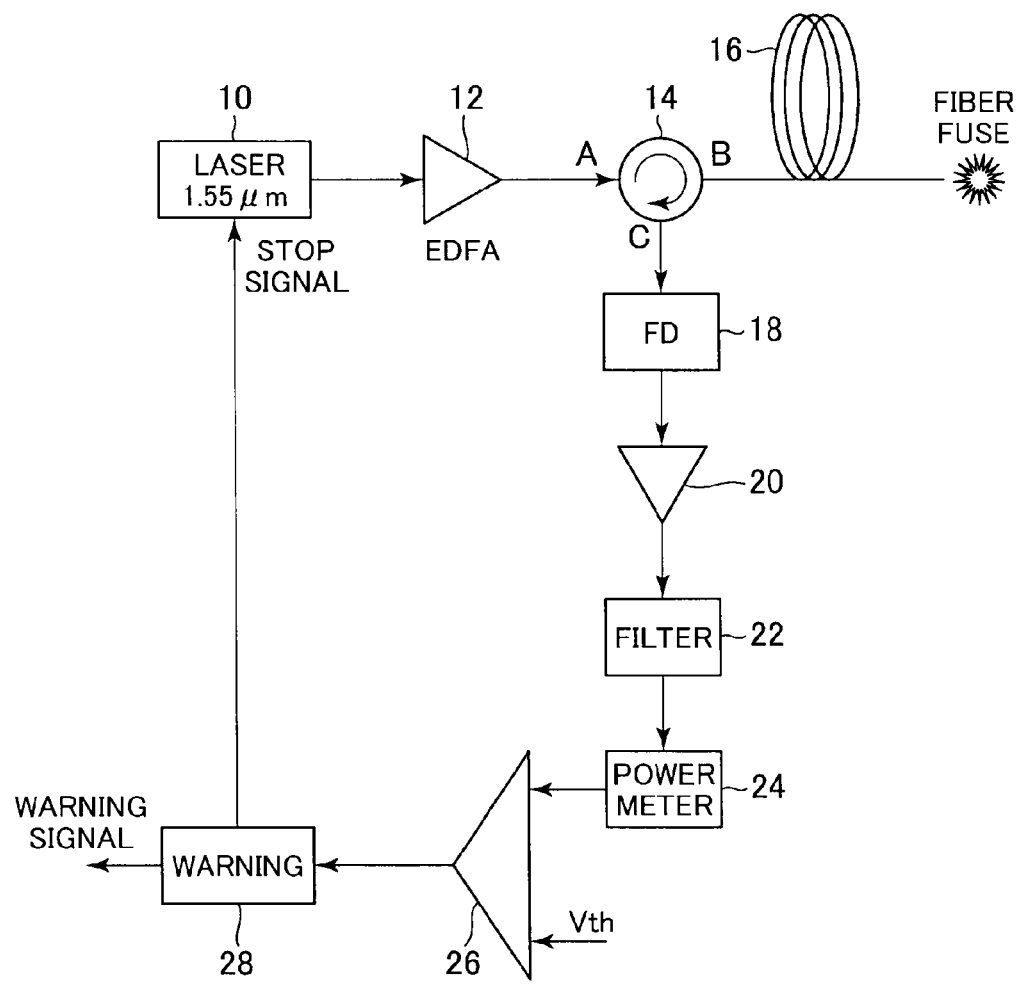
FIG. 1 is a schematic block diagram of a first embodiment of the present invention.

FIG. 1 is a schematic block diagram showing an embodiment of the present invention. Laser 10 outputs a pulsed or CW (continuous wave) laser light. Normally, in the case of signal transmission, the laser light output from the laser 10 is pulsed or CW light, and in the case of power transmission becomes CW light. Optical amplifier 12, which is an erbium-doped fiber amplifier (EDFA), amplifies the power of the light output by the laser 10. The power of the laser light output by the optical amplifier 12 is in the order of several watts.

The laser light output by the optical amplifier 12 enters a transmission optical fiber 16 via an optical circulator 14. The optical circulator 14 is a known optical element that outputs from port B light that enters port A, and outputs from port C light that enters port B. The output of the optical amplifier 12 is connected to port A of the optical circulator 14, and one end of the optical fiber 16 is connected to port B. An optical coupler having the same function can be used in place of the optical circulator 14. In the case of an optical coupler, generally the advantage is that the insertion loss is less than with an optical circulator.

A light receiving element 18 is connected to the port C of the optical circulator 14. That is, reverse direction propagation light that enters port B of the optical circulator 14 is transferred to the light receiving element 18 by the optical circulator 14. Reverse direction propagation light that enters port B of the optical circulator 14 from the optical fiber 16 is various types of return light generated by output laser light from the optical amplifier 12 entering the optical fiber 16, consisting, for example, of scattering light in the optical fiber 16, fiber fuse light generated by fiber fuse, and reflected light generated by the end faces of various parts.

Reverse direction propagation light from the optical fiber 16 is converted to an electric signal by the light receiving element 18, and the electric signal output by the light receiving element 18 is amplified by an amplifier 20. An electric filter 22 extracts noise components, for example 10 kHz~500 kHz, from the electric signal output by the amplifier 20. This is because when a fiber fuse is generated, in the case of CW transmission, an intensity increase of 20 dB or more is detected in the 10 kHz~500 kHz band.

Figure 2:
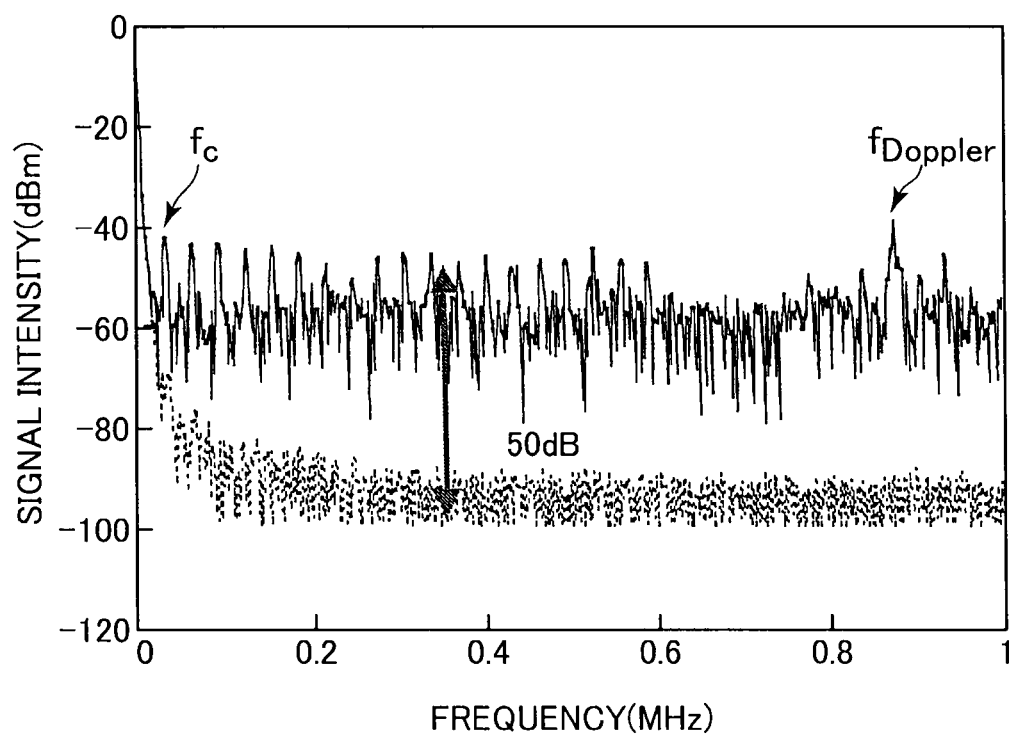
FIG. 2 is a schematic diagram showing changes in the RF spectrum of return light caused by a fiber fuse. The optical fiber used was SMF-28, and the light power was about 2.8 W.

FIG. 2 shows an example of a display when the output of the light receiving element 18 is input to a spectrum analyzer. It can be seen that the signal intensity is around 40 to 50 decibels higher than when there is no fiber fuse. In FIG. 2, fine fluctuations can be seen in the RF spectrum, which are signals having frequencies that are integral multiples of fc shown in FIG. 2. Also, as described below, a signal peak is generated that is shown by $f_{Doppler}$ (=2nV/λ, where n is the refractive index of the optical fiber, v is fuse velocity, and λ is light wavelength). This is one example of an extraction band; in the case of communications applications, a noise band level may be extracted that excludes bands originating in a transmission signal, and in the case of power transmissions, a desired band may be extracted from a frequency of 10 kHz or above. Although it goes without saying, the arrangement of the electric filter 22 and amplifier 20 may be transposed.

Figure 6:
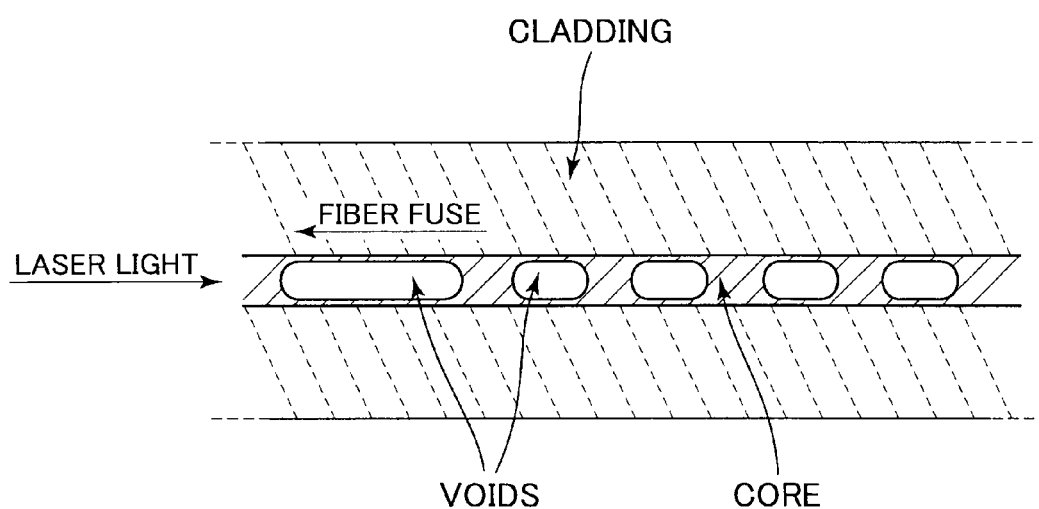
FIG. 6 is a drawing of the vertical section of an optical fiber in which a fiber fuse has occurred.

As shown in FIG. 6, when a fiber fuse is generated, there is periodic formation of voids in the optical fiber 16, and these voids modulate the intensity of the return light. Assuming for example that the fiber fuse advances at a velocity v (m/s), and the pitch of voids of the periodic structure arising in the fiber after the fuse is p (m), the time needed to advance by the amount of one pitch will be p/v. Due to the progress of the fiber fuse in the direction of the light source, return light reflected back in the opposite direction at the place where the fiber fuse has occurred is intensity modulated, with the fundamental repeat frequency $f_0$ of the intensity modulation being as shown by equation 1.

$$f_0 = v/p \quad \text{[Equation 1]}$$

In a fiber fuse experiment using SMF-28 single-mode optical fiber of Corning Inc. of the U.S., for example, when the incident light was a 2.75 W laser light, the fuse progress velocity v was 0.46 m/s and the pitch of the periodic structure was 15 μm, so from the above equation the fundamental frequency $f_0$ was 31 kHz. It is considered that such an intensity modulation may bring about an increase in the noise level.

A power meter 24 measures the output level of the electric filter 22 as the average power thereof, and outputs a voltage value that represents the measured noise power. The E9304A power sensor of Agilent Technologies of the U.S., for example, can be used as the power meter 24. A comparison circuit 26 compares the output voltage of the power meter 24 with a threshold value Vth. When a fiber fuse phenomenon is generated with the optical fiber 16, the noise power output from the electric filter 22 increases. In the experiment example, as shown in FIG. 2, an increase in the order of 50 dB was detected. The threshold value Vth, following the generation of the fiber fuse, may be set to a value slightly below the noise value output by the electric filter 22. When the status is that of non-occurrence of fiber fuse, the output of the comparison circuit 26 is low (L), and when a fiber fuse occurs, the output transitions to high (H).

When the output of the comparison circuit 26 transitions from L to H, a warning circuit 28 transmits a stop signal to the laser 10, stopping laser output. Thereby, the progress of the fiber fuse in the optical fiber 16 can be promptly stopped, making it possible to prevent beforehand a replacement situation caused by burn damage to the long optical fiber 16. The warning circuit 28 also outputs a sound warning from a loudspeaker, or outputs a warning signal that displays a warning on a monitor screen.

In this embodiment, the warning circuit 28 outputs both a stop signal to the laser 10 and a warning signal to a supervisor, but it can just emit a warning.

If T is the time margin from fiber fuse generation to incident laser shutoff, have the upper cutoff frequency of the electric filter 22 correspond as far as possible to 1/T. If the upper cutoff frequency of the electric filter 22 is less than 1/T, the incident laser cutoff speed will be determined by the response speed of the portion from the light receiving element 18 to the comparison circuit 26.

While in this embodiment, when a fiber fuse is detected the laser 10 is stopped, but the output power of the laser 10 may also be reduced to a level at which fiber fuse does not occur.

Embodiment 2

Figure 3:
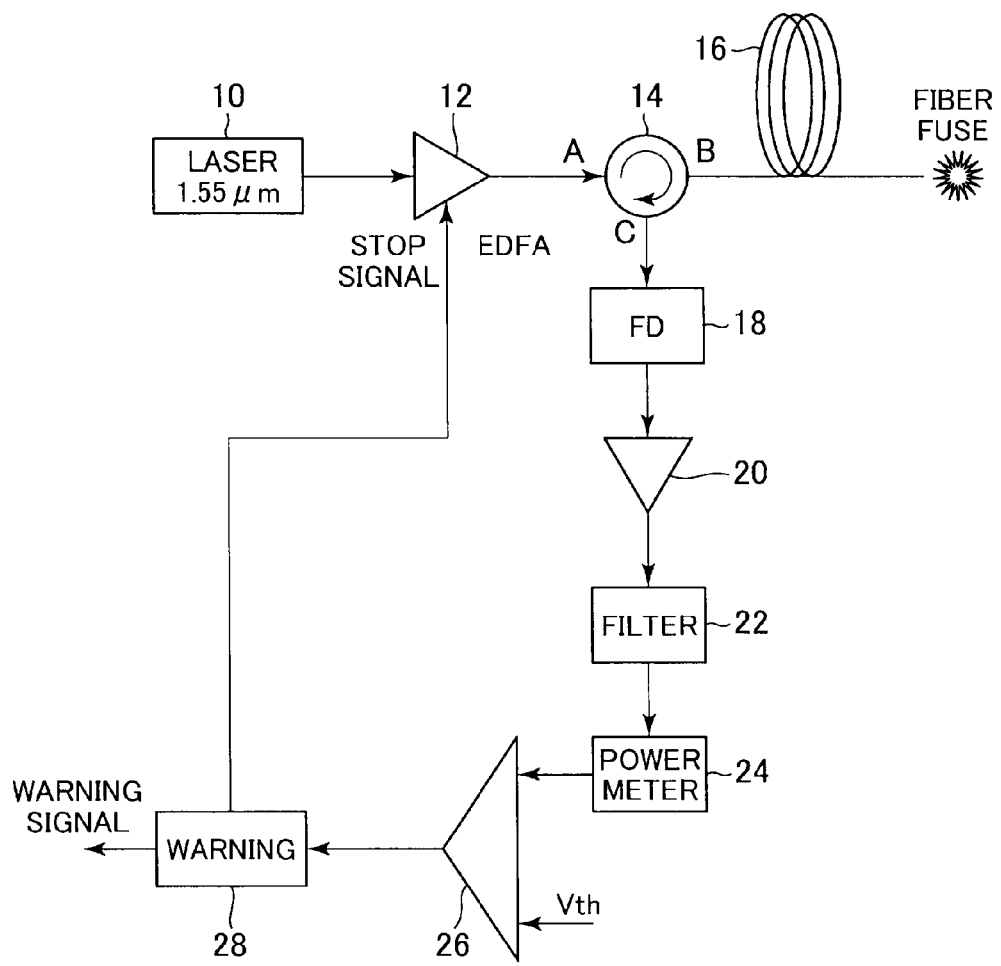
FIG. 3 is a schematic block diagram of a second embodiment of the present invention.

FIG. 3 shows a schematic block diagram of an embodiment 2 of the present invention. In the embodiment shown in FIG. 1, the warning circuit 28 stops the output of laser 10 when the generation of a fiber fuse is detected, but as shown in FIG. 3, the warning circuit 28 may be made to stop the optical amplifier 12. For example, the pump light input to the optical amplifier 12 is stopped. In this case, the optical amplifier 12 functions as an attenuator. The power of the laser light entering the optical fiber 16 is of an order that does not cause fiber fuse generation, making it possible, as in the embodiment 1, to promptly stop the progress of the fiber fuse in the optical fiber 16.

Without completely stopping the amplification operation of the optical amplifier 12, the warning circuit 28 may be made to reduce the amplification factor of the optical amplifier 12 to where fiber fuse does not arise.

Embodiment 3

Figure 4:
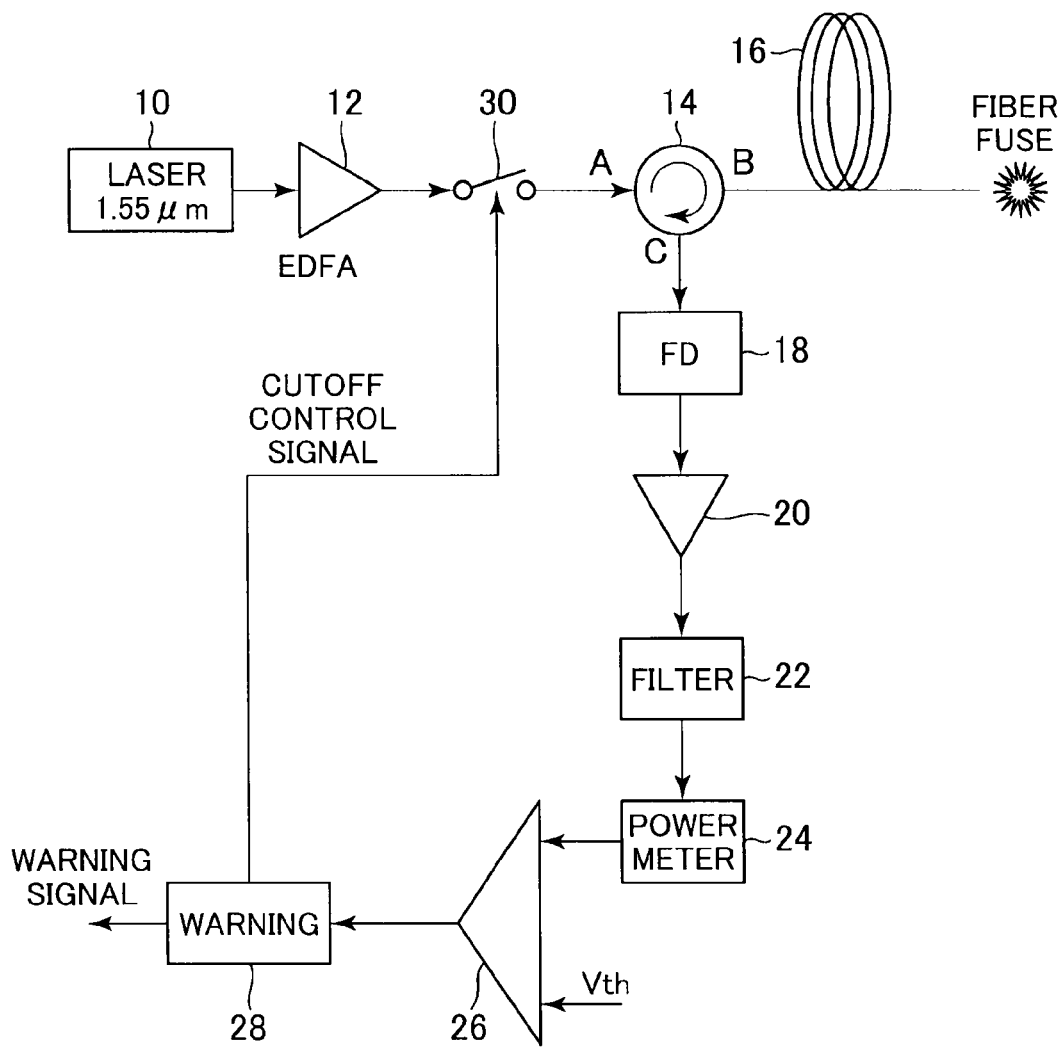
FIG. 4 is a schematic block diagram of a third embodiment of the present invention.

FIG. 4 shows a schematic block diagram of an embodiment 3 of the present invention. As shown in FIG. 4, an optical breaker 30 may be provided between the laser 10 and optical amplifier 12, or between the optical amplifier 12 and optical circulator 14, and the output of the warning circuit 28 used to have the optical breaker 30 cut off the light when a fiber fuse is generated. As shown schematically in FIG. 4, the optical breaker 30 is comprised of a normally-closed optical switch that is opened by a cutoff control signal from the warning circuit 28, cutting off the incident light signal to the optical fiber 16.

Instead of the optical breaker 30, a variable optical attenuator may be arranged the attenuation factor of which is increased when a fiber fuse is detected, reducing the power of the laser input to the optical fiber 16. Although the configuration in which the optical attenuator is normally out of the optical path and is inserted into the optical path when a fiber fuse to be fused is detected has a slow response, it fulfills the same function as a variable optical attenuator.

Embodiment 4

Figure 5:
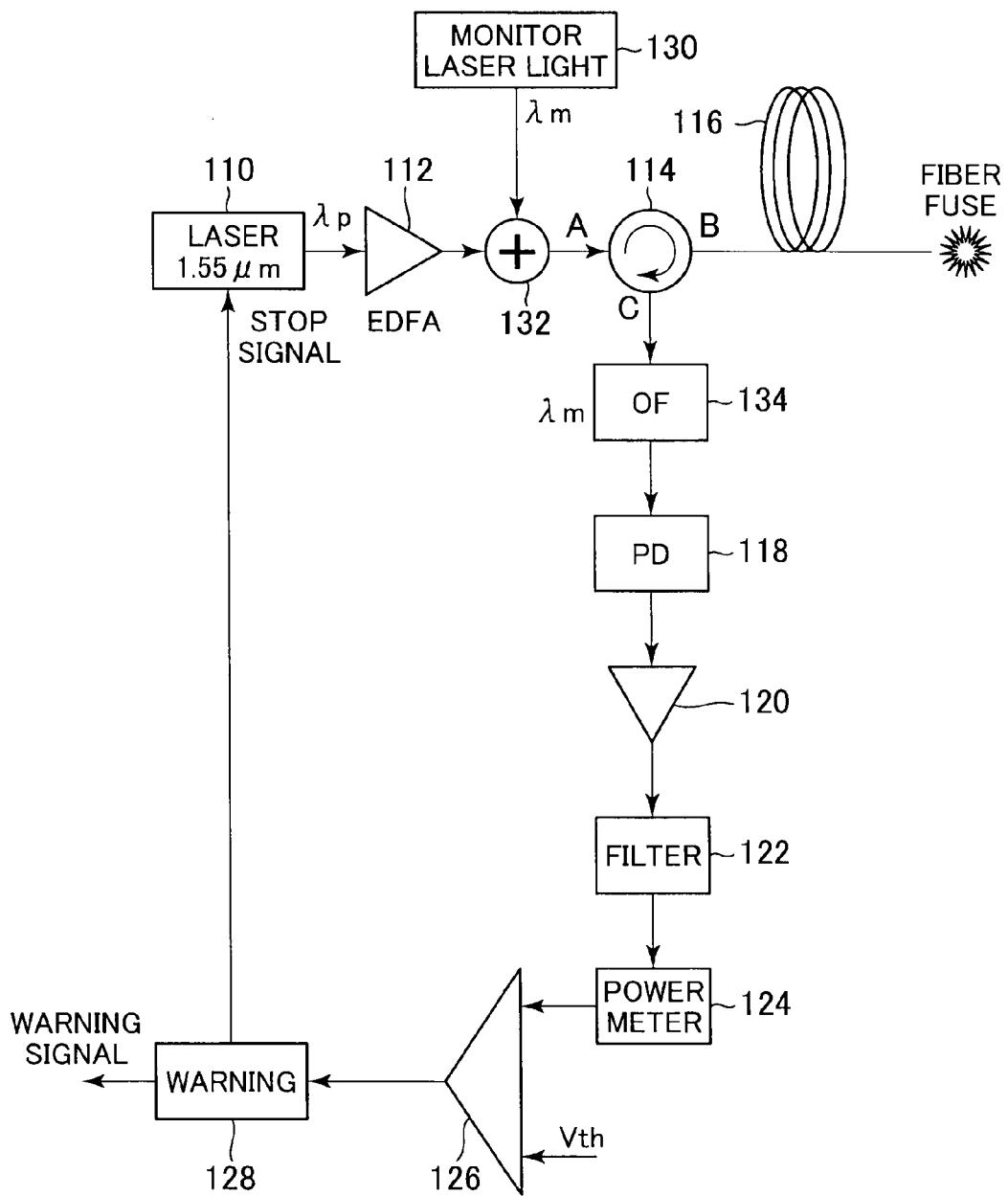
FIG. 5 is a schematic block diagram of a fourth embodiment of the present invention.

In each of the above embodiments, when an end surface having high reflectivity is generated by the bending or suchlike of the optical fiber 16, there is a possibility that high intensity return light falling incident on the light receiving element 18 destroys the light receiving element 18. Therefore, next, an embodiment is described that reduces the possibility of the light receiving element 18 being thus destroyed. FIG. 5 shows a block schematic diagram of the embodiment.

Laser 110 outputs a pulsed or CW laser light in the order of several watts. The wavelength of the laser light is given a signal wavelength $\lambda p$. Normally, as in the case of laser 10, when pulse modulated the laser light output from the laser 110 is pulsed light, and when phase modulated or in the case of power transmission, is CW light. Optical amplifier 112, which is an erbium-doped optical fiber amplifier, amplifies the power of the light output by the laser 110.

On the other hand, a monitor laser light generator 130 generates monitor light or monitor laser light having a wavelength $\lambda m$ (monitor wavelength) that is different from wavelength $\lambda p$. An optical multiplexer 132 multiplexes monitor laser light from the monitor laser light generator 130 with light output by the optical amplifier 112, and the multiplexed light enters port A of an optical circulator 114.

A transmission optical fiber 116 is connected to port B of the optical circulator 114, and port C is connected to an optical filter 134 that transmits light of monitor wavelength $\lambda m$ and blocks light of signal wavelength $\lambda p$.

Multiplexed light that enters port A of the optical circulator 114 from the optical multiplexer 132 is supplied from port B to the transmission optical fiber 116, and reverse direction propagation light from the transmission optical fiber 116 that enters port B is supplied to optical filter 134.

As described earlier, return light of wavelength $\lambda p$ is intensity modulated by the generation of fiber fuse, and as a result there is an increase in the noise level when viewed in terms of frequency domain. Similarly, monitor return light of monitor frequency $\lambda m$ is intensity modulated, increasing the noise level when viewed in terms of frequency domain. It therefore follows that, as in embodiments 1 to 3, fiber fuse generation can be detected not by wavelength $\lambda p$ return light but by monitor return light.

Optical filter 134 extracts only monitor wavelength $\lambda m$ components from light output from port C of the optical circulator 114, and supplies it to light receiving element 118. The monitor light is not high power, so that even if the optical fiber 116 should be cut or the like, producing an end surface having high reflectivity, the light receiving element 118 can be protected by having no high intensity return light of signal wavelength $\lambda p$ impinge on the light receiving element 118.

Reverse direction propagation light from optical filter 134 of monitor wavelength $\lambda m$ is converted to an electric signal of the light receiving element 118, and amplifier 120 amplifies the electric signal output by the light receiving element 118. The electric filter 122, which is provided with the same filter characteristics as electric filter 22, extracts noise components from the electric signal output of the amplifier 120. In this embodiment, too, the arrangement of the electric filter 122 and amplifier 120 may be transposed. Like the power meter 24, the power meter 124 measures the average output power of the electric filter 122 and outputs a voltage value that represents the measured power.

A comparison circuit 126 compares the output voltage value (noise power) of the power meter 124 with a threshold value Vth. When a fiber fuse phenomenon is generated with the optical fiber 116, the power output from the electric filter 122 increases. When the status is that of non-occurrence of fiber fuse, the output of the comparison circuit 26 is low (L), and when a fiber fuse occurs, the output transitions to high (H).

When the output of the comparison circuit 126 transitions from L to H, a warning circuit 128 transmits a stop signal to the laser 110, stopping laser output. Thereby, the progress of the fiber fuse in the optical fiber 116 can be promptly stopped, making it possible to prevent beforehand a replacement situation of the long optical fiber 116. The warning circuit 128 also outputs a spoken warning from a loudspeaker, or outputs a warning signal that displays a warning on a monitor screen. The warning circuit 128 outputs both a stop signal to the laser 110 and a warning signal to a supervisor, but it can just emit a warning.

As in embodiment 2, the warning circuit 128 may be made to stop the amplification operation of the optical amplifier 112, or may control an optical breaker arranged between the optical amplifier 112 and the optical circulator 114 to interrupt laser light of signal wavelength $\lambda p$ incidenting the optical fiber 116.

Embodiments have been described that stop, interrupt or reduce the incident power of high power laser light at various stages between the lasers 10, 110 and transmission optical fibers 16, 116, but is the surest is to stop the lasers 10, 110 themselves. That is because it is impossible to exclude the possibility of fiber fuse occurring on the light transmission path located between the lasers 10, 110 and the transmission optical fibers 16, 116. In cases in which the lasers 10, 110 cannot be stopped, it is preferable to interrupt, or reduce the power of, the laser light at a place near the lasers 10, 110.

The present invention is also effective when the optical fibers 16, 116 or portions thereof are a Raman amplifying medium and the laser light output by the lasers 10, 110 is used as Raman amplified pumping light. That is, the present invention can also be applied to optical systems in which fiber fuse is likely to arise due to high power Raman pumping light in the optical fiber that is the Raman amplifying medium or in the transmission optical fiber beyond.

It is clear that the present invention is not limited to a specific laser wavelength. That is, while the example shown was that of a laser light source wavelength of 1.55 µm, the laser may be of another type having a different wavelength, such as for example a 1.05 µm wavelength Yb system laser.

While the present invention has been described with reference made to specific explanatory embodiments, it will be clear to a person skilled in the art of the invention that the above embodiments may be changed and modified in various ways to the extent that that does not depart from the technical scope of the invention defined in the scope of the patent claims, and that such changes and modifications are included in the technical scope of the invention.

Embodiment 5

Figure 7:
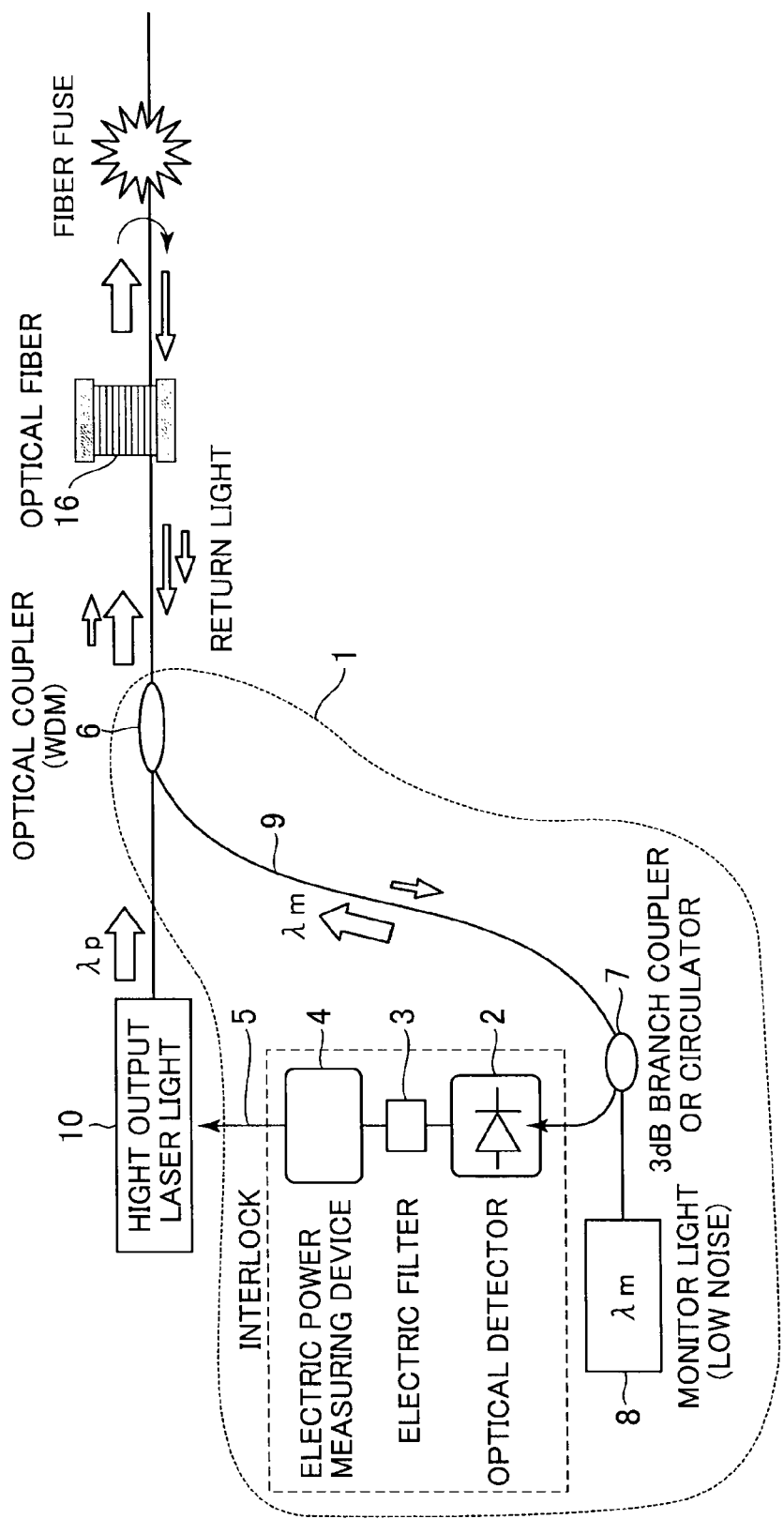
FIG. 7 is a schematic block diagram of a fifth embodiment of the present invention.

The fiber fuse detecting apparatus 1 shown in FIG. 7 incidents laser light from the high output laser light source 10 to the optical fiber 16. In the incidenting, monitor light from a monitor light source 8 passing along an optical path 9 is combined with the above laser light, using, for example, a wavelength division multiplexing (WDM) coupler 6. As return light from the optical fiber 16 passes through the wavelength division multiplexing coupler 6, the wavelength division multiplexing coupler 6 branches the above monitor light onto the optical path 9.

By making the above laser light have a different wavelength from that of the monitor light, and coupling the WDM coupler 6 with an optical path that matches the characteristics of the WDM coupler 6, the branching makes it possible to almost completely separate the monitor light contained in the above return light.

Return light on the optical path 9 is branched to an optical detector 2 by a branching device 7 such as an optical coupler or circulator or the like.

The output of the optical detector 2 is amplified if required, and filtered by an electric filter 3 to extract a signal that is characteristic to optical fiber fuse. As described with reference to the above embodiment 1, this signal is in a characteristic frequency band, and can therefore be selected with a frequency filter. The output of the electric filter 3 is measured by an electric power measuring device 4 and the measurement result is judged. The comparison means used in this judging, depending on the internal circuitry of the electric power measuring device 4, may be an analogue signal comparator, or a logic circuit that digitizes the signal and carries out a numerical value judgment. The output of the high output laser light source 10 is controlled by the judgment result of the electric power measuring device 4. In a case in which a fiber fuse has been generated, this control will stop or suppress the output of the high output laser light source 10.

Embodiment 6

Figure 8:
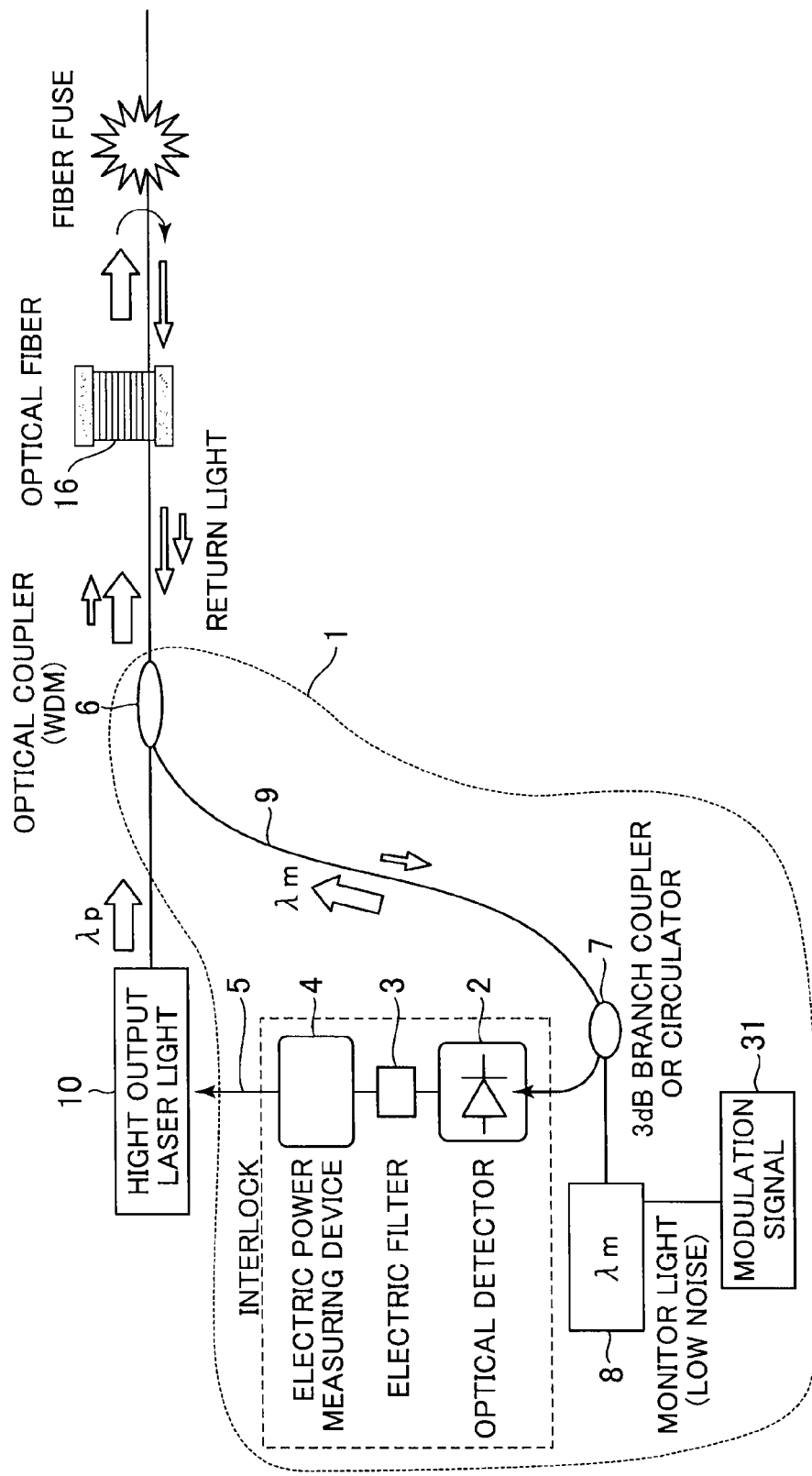
FIG. 8 is a schematic block diagram of a sixth embodiment of the present invention, an example in which the monitor light source is directly modulated.

Unlike in the case of embodiment 5, the fiber fuse detecting apparatus 1 shown in FIG. 8 does not use monochromatic light itself as the monitor light, but a spectrally broadened light. This kind of monitor light can be readily obtained by modulating monochromatic light. In FIG. 8, a semiconductor laser, for example, is used as the monitor light source. Generally, it is known that a semiconductor laser can be modulated by a supplied current. To inhibit Brillouin scattering, this modulation can be done at a frequency between several tens of megahertz and several hundred megahertz. Brillouin scattering can be inhibited by this modulation. On the other hand, it does not have an adverse effect on fiber fuse detection as the modulation frequency band does not overlap the modulation band that is characteristic to fiber fuse.

Embodiment 7

Figure 9:
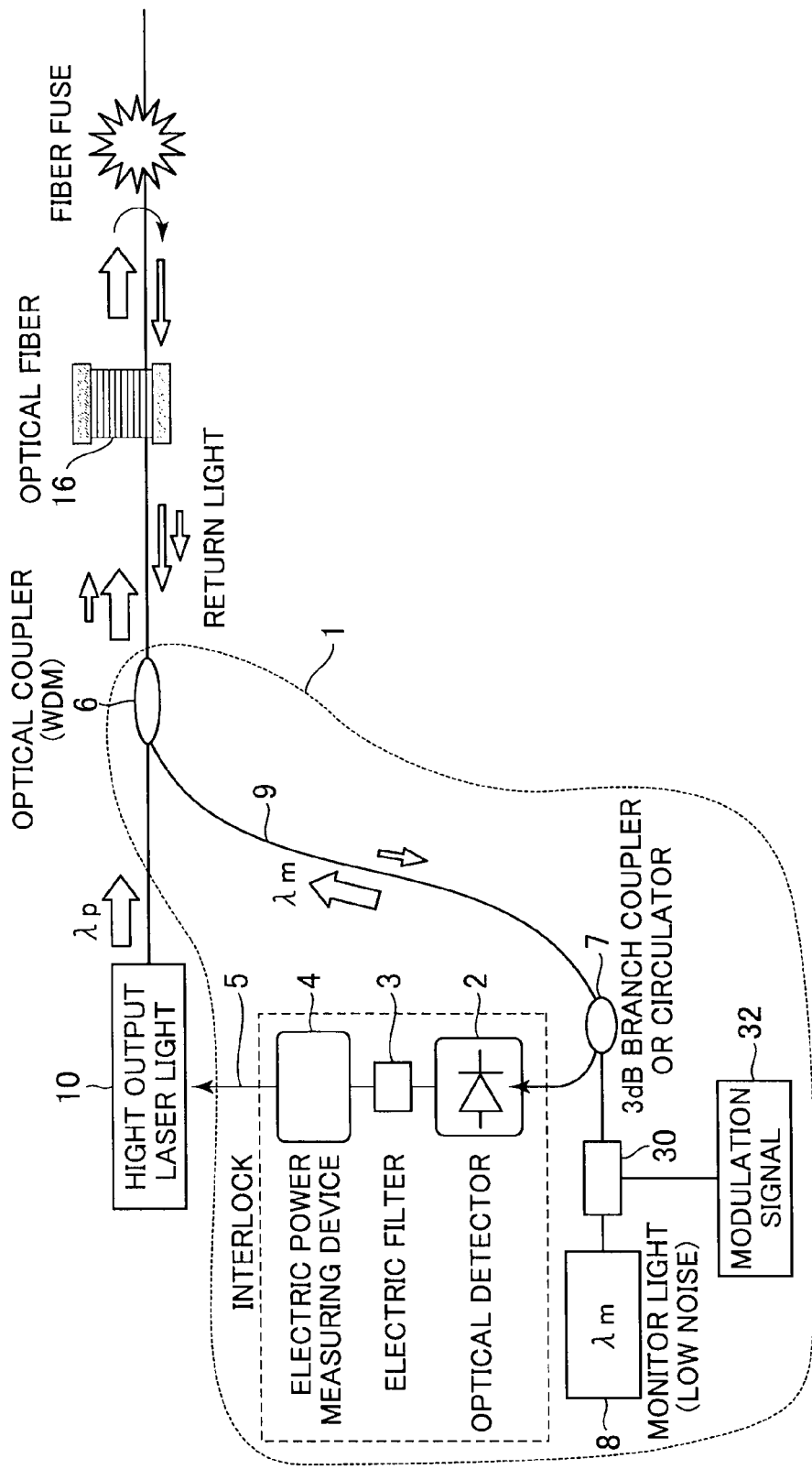
FIG. 9 is a schematic block diagram of a sixth embodiment of the present invention, an example in which monochromatic light from a low-noise monitor light source is modulated by the modulator 30.

Also, as in the above case, the fiber fuse detecting apparatus 1 shown in FIG. 9 uses modulated monitor light, but unlike in the case of embodiment 6, instead of the monitor light source being directly modulated, modulator 30 is used to modulate monochromatic light from a low-noise monitor light source.

Embodiment 8

Figure 10:
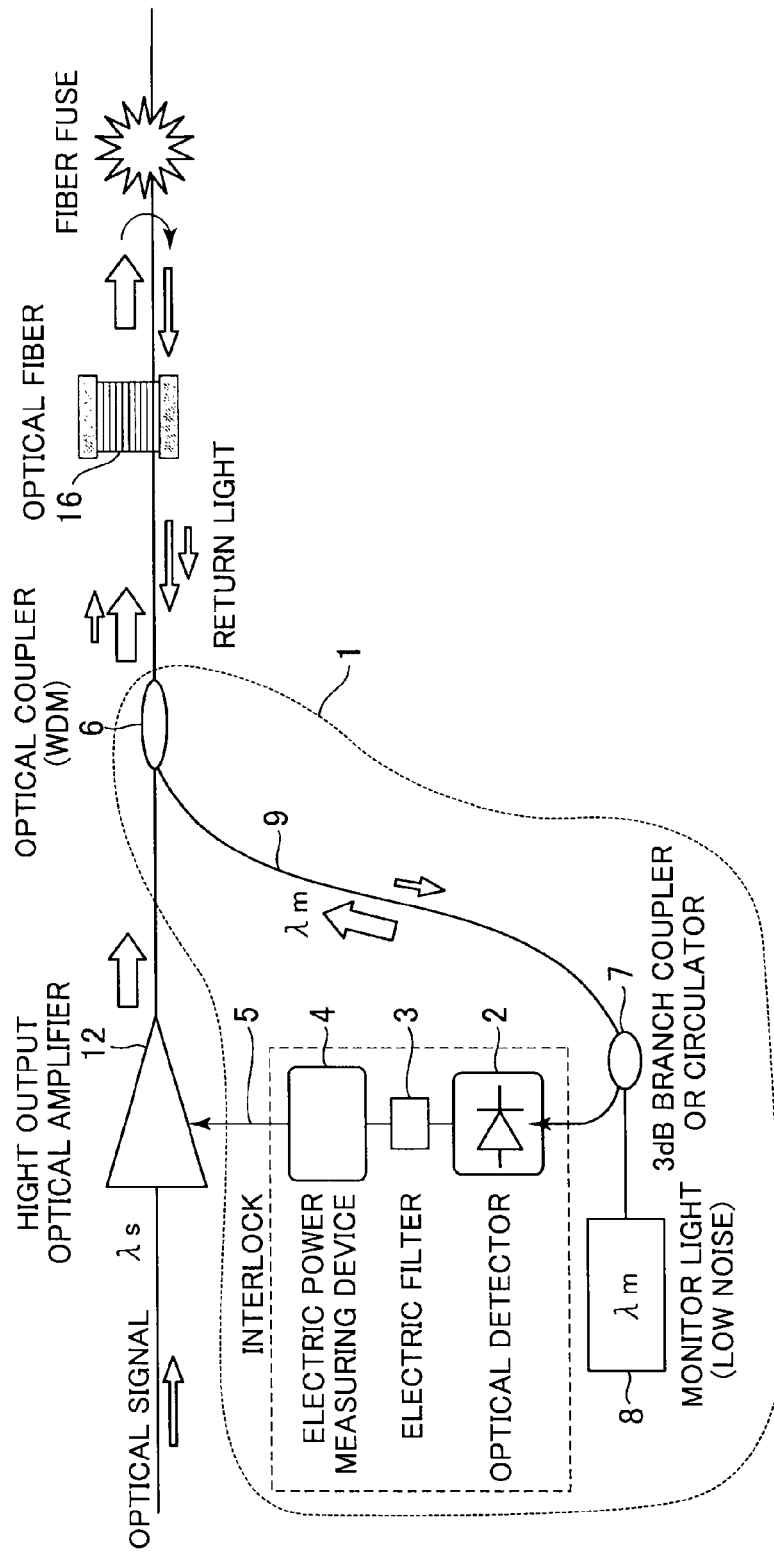
FIG. 10 is a schematic block diagram of a seventh embodiment of the present invention.

Instead of laser light from the high output laser light source 10, the example of the fiber fuse detecting apparatus 1 shown in FIG. 10 uses laser light from the light output optical amplifier 12. When the fiber fuse detecting apparatus 1 detects a fiber fuse manifestation, it emits a signal that stops amplification by the light output optical amplifier 12 or reduces the amplification factor. Instead of controlling the amplification factor, an optical switch or the like may be used to interrupt light input to the light output optical amplifier 12.

Embodiment 9

Figure 11:
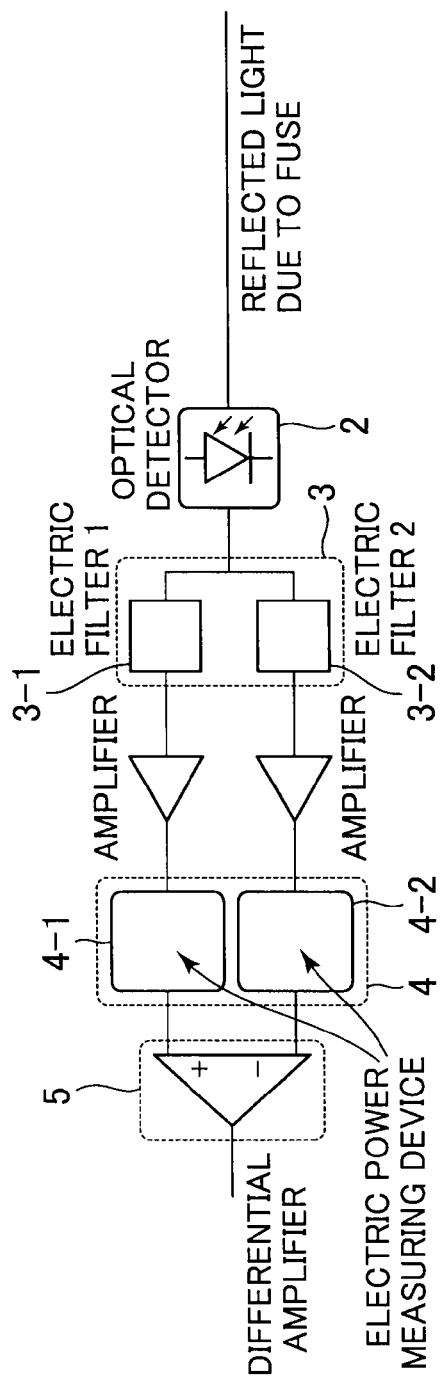
FIG. 11 is a block diagram that shows an example of a detection circuit that compares two different wavelength bands into which the output from an optical detector is divided.

Looking at the graph of FIG. 2 which shows when there is fiber fuse, it can be seen that down to just below 0.6 MHz, there is a group of peaks that have a comb-shaped frequency distribution originating in fiber fuse, and at around 0.87 MHz, there is a peak due to the Doppler effect that accompanies the progress velocity of fiber fuse. This Doppler frequency is generated by reflected light from a travelling type fuse and the beat of spurious reflected light (reflected light from optical fiber connectors or the like). This experimental value of 0.87 MHz is the same value as the theoretical value of the Doppler frequency ($2nv/\lambda$) when the refractive index n=1.5, wavelength $\lambda$=1.55 μm, and v=0.45 m/s. Therefore, as shown in FIG. 11, by splitting the output of the optical detector 2 into two and using an electric filter 3-1 that extracts frequency band A, or a part thereof, having groups of pronounced peaks with a comb-shaped frequency distribution that originates in fiber fuse, and an electric filter 3-2 that extracts frequency band B or a part thereof between the frequency band A and the peak caused by the above Doppler effect, each is extracted. Frequency band B is for example 0.6 to 0.85 MHz. Also, electric filter 3-1 may be a bandpass filter with a Doppler center frequency, and electric filter 3-2 may be one with a similar bandwidth with the center slightly offset so that it does not contain Doppler frequency components. Also, the intensity of each is measured by respective power measuring devices 4-1 and 4-2. When the frequency bands A and B have different bandwidths, they will be converted to values corresponding to the respective frequency power densities. The outputs of the power measuring devices 4-1 and 4-2 are judged by a judgment device using, for example, a differential amplifier 5. This can of course be done by digitizing the signals and using a logic circuit to carry out numerical value judgments.

Figure 12:
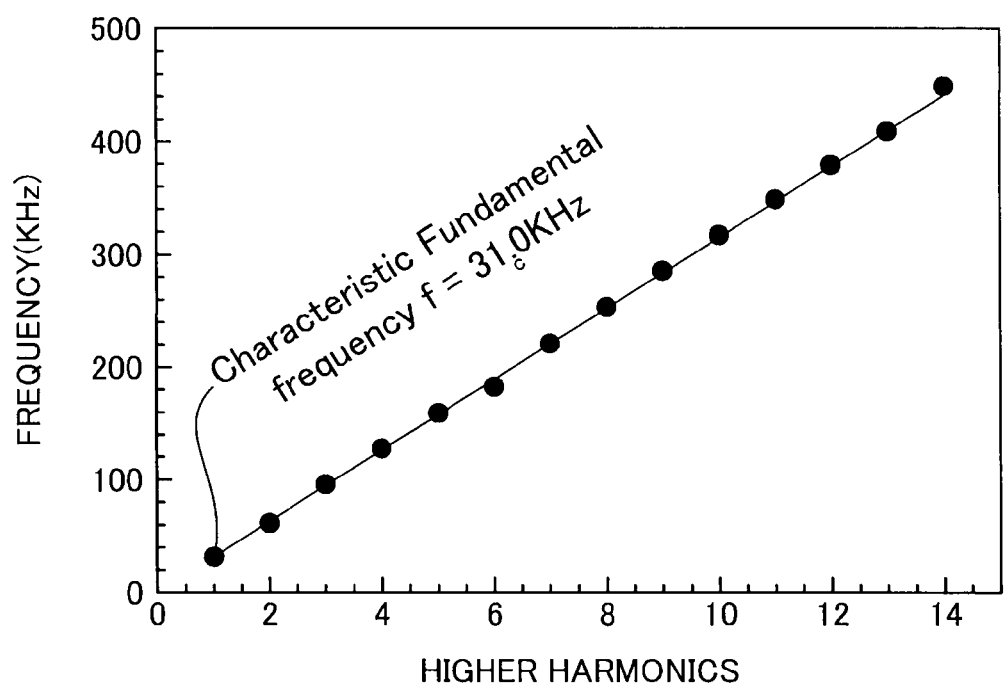
FIG. 12 is a diagram in which a group of peaks having a comb-shaped frequency distribution caused by a fiber fuse is composed of a plurality of peaks arrayed at regular intervals.

As shown in FIG. 12, the element peaks of the groups of peaks are higher harmonics of a 31 kHz signal. Therefore, it can be understood that the detection sensitivity can be improved by applying a comb filter to the electric filter 3-1 to selectively extract each peak. A comb-shaped filter frequency can be readily changed, so it is easy to apply a frequency-variable comb-shaped filter to the electric filter 3-1.

Figure 13:
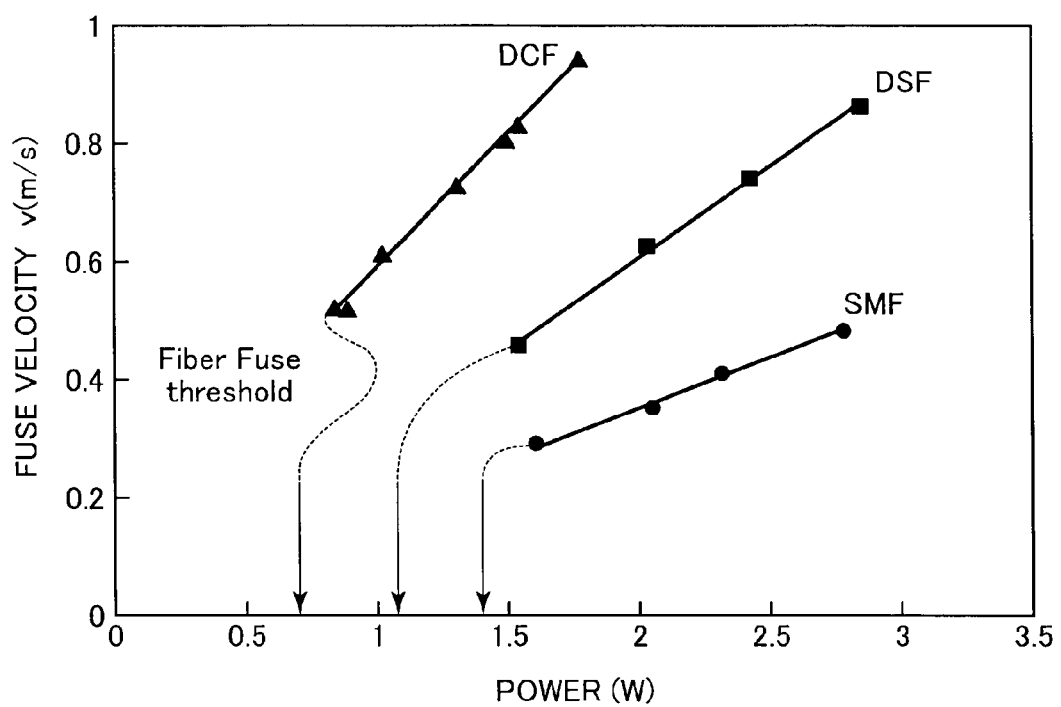
FIG. 13 shows measured values of fiber fuse progress velocity and incident light power.

FIG. 13 shows measured values of fiber fuse travel velocity and incident light power. These are in respect of DCF (dispersion compensating fiber), DSF (dispersion-shifted single-mode fiber) and SMF (general purpose single-mode fiber), and the arrows indicate the respective power thresholds at which optical fiber fuse occurs. Reducing the light intensity to or below the threshold value interrupts fuse generation. The travel velocity increases with increase in incident laser light intensity. From this, the position of the peak frequency due to the Doppler effect can be readily estimated, making it possible to determine the frequency band B.

INDUSTRIAL APPLICABILITY

When the fiber fuse detecting apparatus of the present invention is to be actually operated, it is preferable to run an operating test after attaching the fiber detecting apparatus. Fiber fuse can readily be intentionally generated by for example adhering to the end surface of an optical fiber a liquid such as correcting fluid (stationery) that contains fine particles, while light of several watts is exiting from the end surface. Several meters of optical fiber is sufficient for this test. After the test, the destroyed portion can be cut off to return the optical fiber to its original state.

However, fiber fuse is a destructive phenomenon that destroys the transmission path used for optical communication applications, for example, so in practice it is difficult to actually generate fiber fuse and carry out an operating test.

That being the case, an operating test can be conducted without damaging the optical fiber by transmitting a pseudo fiber fuse signal from the side opposite the side on which laser light from the optical fiber 16 falls incident, and using the fiber fuse detecting apparatus to actually detect that. This kind of pseudo fiber fuse signal may be one similar to the signal of FIG. 2 when there is a fiber fuse, which can be readily generated.

The invention claimed is:

1. A fiber fuse detecting apparatus that detects fiber fuse in an optical fiber that propagates laser light, comprising
    light input means that is arranged on a laser light incidence side of the optical fiber and that inputs at least a portion of the laser light propagating in a reverse direction to a direction of the laser light incident on the optical fiber,
    a light receiving element that photo-electrically converts light input by the light input means,
    an electric band-pass filter that extracts from an output of the light receiving element a prescribed frequency band component that contains a periodic signal due to fiber fuse, the prescribed frequency band component being in a range from 10 kHz to 500 kHz,
    detecting means that detects an output level of the electric band-pass filter, and compares the output level or a change of the output level with a prescribed value, and
    warning circuit that emits a warning signal in response to an output of the detecting means indicating the output level or the change of the output level is above the prescribed value.

2. The fiber fuse detecting apparatus as described in claim 1, wherein the apparatus includes light transmission means that transmits a light transmission signal as the laser light to the optical fiber, and wherein the light input means inputs at least a portion of the laser light from the light transmission means reflected by the fiber fuse.

3. The fiber fuse detecting apparatus as described in claim 1, wherein the light input means is an optical coupler.

4. The fiber fuse detecting apparatus as described in claim 3, wherein the optical coupler is a wavelength division multiplexing system coupler.

5. The fiber fuse detecting apparatus as described in claim 3, wherein the light transmission means includes a fiber fuse monitor laser light source, and light from the monitor laser light source is input to the optical fiber via the optical coupler.

6. The fiber fuse detecting apparatus as described in claim 5, wherein at least a portion of the laser light input by the light input means is branched to the detecting means by an optical coupler or circulator, and
    light from the monitor laser light source is input to the optical fiber via the optical coupler or circulator and the light input means.

7. The fiber fuse detecting apparatus as described in claim 1 that, when the electric band-pass filter is a first electric band-pass filter, further comprising a second electric band-pass filter that extracts a frequency band having an intensity that is not increased by fiber fuse generation, and wherein the detecting means compares a first output level of the first electric band-pass filter and a second output level of the second electric band-pass filter.

8. The fiber fuse detecting apparatus as described in claim 5, wherein the light from the monitor laser light source has been optically modulated to prevent Brillouin scattering in the optical fiber.

9. The fiber fuse detecting apparatus as described in claim 1, wherein the light input means is an optical separation means that separates the laser light propagating in the reverse direction from the laser light propagating in the direction towards the optical fiber.

10. The fiber fuse detecting apparatus as described in claim 9, wherein the optical separation means is arranged between a laser light source that outputs the laser light and the optical fiber, and is an optical element that transfers the laser light output by the laser light source to the optical fiber, and transfers the laser light propagating in the reverse direction from the optical fiber to the light receiving element.

11. The fiber fuse detecting apparatus as described in claim 10, comprising an optical multiplexer that multiplexes the laser light incident on the optical fiber with monitor light having a different wavelength from that of the laser light and supplies the multiplexed light to the optical fiber, and
    an optical filter that passes though the monitor light contained in the laser light propagating in the reverse direction separated by the separation means, and blocks the laser light, wherein
    the light receiving element photo-electrically converts output light from the optical filter.

12. The fiber fuse detecting apparatus as described in claim 1, wherein in response to the output by the detecting means, the warning circuit emits a signal that stops the laser light incident on the optical fiber.

13. The fiber fuse detecting apparatus as described in claim 1, wherein in response to the output by the detecting means, the warning circuit emits a signal that reduces incident power of the laser light incident on the optical fiber.

14. The fiber fuse detecting apparatus as described in claim 1, wherein the apparatus includes an optical amplifier that optically amplifies the laser light before it incidents the optical fiber, wherein in response to the output by the detecting means, the warning circuit emits a signal to stop, or to reduce an amplification factor of the optical amplifier.

15. The fiber fuse detecting apparatus as described in claim 12, wherein in response to the output by the detecting means, the warning circuit controls a light source that generates the laser light to reduce laser output power thereof.

16. The fiber fuse detecting apparatus as described in claim 13, wherein in response to the output by the detecting means, the warning circuit controls a light source that generates the laser light to reduce laser output power thereof.

* * * * *